US009625139B2

(12) United States Patent
Lax et al.

(10) Patent No.: US 9,625,139 B2
(45) Date of Patent: Apr. 18, 2017

(54) MODULAR LED LIGHTING ASSEMBLY

(75) Inventors: Daniel A. Lax, New York, NY (US); Timothy J. Keuning, Northport, NY (US); Agjah I. Libohova, East Setauket, NY (US)

(73) Assignee: Autronic Plastics, Inc., Central Islip, NY (US)

( * ) Notice: Subject to any disclaimer, the term of this patent is extended or adjusted under 35 U.S.C. 154(b) by 251 days.

(21) Appl. No.: 13/271,115

(22) Filed: Oct. 11, 2011

(65) Prior Publication Data

US 2012/0127702 A1 May 24, 2012

Related U.S. Application Data

(60) Provisional application No. 61/391,608, filed on Oct. 9, 2010.

(51) Int. Cl.

| | |
|---|---|
| ***B60Q 1/26*** | (2006.01) |
| ***F21V 23/02*** | (2006.01) |
| ***F21S 8/00*** | (2006.01) |
| ***F21S 8/04*** | (2006.01) |
| ***F21V 21/02*** | (2006.01) |
| ***F21V 29/76*** | (2015.01) |
| *F21S 2/00* | (2016.01) |
| *F21V 17/10* | (2006.01) |

(Continued)

(52) U.S. Cl.
CPC ............ *F21V 23/026* (2013.01); *F21S 8/033* (2013.01); *F21S 8/043* (2013.01); *F21V 21/02* (2013.01); *F21V 23/023* (2013.01); *F21V 29/76* (2015.01); *F21K 9/20* (2016.08); *F21S 2/005* (2013.01); *F21V 17/104* (2013.01); *F21V 19/001* (2013.01); *F21W 2131/101* (2013.01); *F21W 2131/40* (2013.01); *F21Y 2105/10* (2016.08); *F21Y 2113/00* (2013.01); *F21Y 2115/10* (2016.08)

(58) Field of Classification Search
CPC ................................ F21V 15/01; F21V 21/02
USPC ..... 362/227, 249.01, 249.02, 362, 368, 374, 362/375, 800
See application file for complete search history.

(56) References Cited

U.S. PATENT DOCUMENTS 4,369,487 A 1/1983 Carlow
6,072,708 A 6/2000 Fischer
(Continued)

OTHER PUBLICATIONS

Philips Lumileds Press Information, Jan. 23, 2007.
(Continued)

*Primary Examiner* — William Carter
(74) *Attorney, Agent, or Firm* — Zollinger & Burleson Ltd.

(57) ABSTRACT

A modular lighting assembly uses LED banks as the light sources. The assembly allows the power supply and LED banks to be independently replaced. The assembly uses a power supply that is separated from the LED banks and electrically connected to the LED banks with a plug connector that may be unplugged and plugged back in to allow the power supply or LED bank to be independently and readily replaced. The assembly provides for easy replacement of the different components of the assembly. One feature that makes the components easier to replace is that the light modules and/or the power supply may be carried by the housing that is removable from the base mount that is secured to a mounting structure such as a wall or ceiling.

22 Claims, 4 Drawing Sheets

(51) Int. Cl.

| | |
|---|---|
| *F21V 19/00* | (2006.01) |
| *F21W 131/101* | (2006.01) |
| *F21W 131/40* | (2006.01) |
| *F21Y 113/00* | (2016.01) |
| *F21K 9/20* | (2016.01) |
| *F21Y 105/10* | (2016.01) |
| *F21Y 115/10* | (2016.01) |

(56) References Cited

U.S. PATENT DOCUMENTS 6,283,621 B1 * 9/2001 Macri .......................... 362/488
7,140,742 B2 11/2006 Pohlert
7,229,185 B1 6/2007 Galvez
7,922,354 B2 * 4/2011 Everhart ............... F21V 23/009 362/234
7,926,982 B2 * 4/2011 Liu ....................... F21V 29/004 362/218
8,814,376 B2 8/2014 Nicolai et al.
9,316,370 B2 4/2016 Lax et al.
2005/0174755 A1 * 8/2005 Becker .......................... 362/133
2006/0215422 A1 9/2006 Laizure
2007/0195527 A1 8/2007 Russell
2007/0274084 A1 * 11/2007 Kan et al. ..................... 362/373
2008/0212319 A1 * 9/2008 Klipstein ...................... 362/231
2008/0297701 A1 * 12/2008 Lee .................. G02F 1/133603 362/231
2010/0019690 A1 1/2010 Libohova et al.
2011/0058358 A1 * 3/2011 Soo et al. ..................... 362/147
2014/0254132 A1 9/2014 Nicolai et al.

OTHER PUBLICATIONS

ProTran 1, 120VAC LED Safety Light, Sep. 12, 2008.
ProTran1, 1000VDC LED Safety Light, Sep. 12, 2008.
ProTran1, 1000VDC White LED Portable Lamp Bank for MOW, Dec. 20, 2008.
Lumascape, LED Product catalogue 2008. Mar. 2008.
Copyright 2014, Apogee Translite, Inc., series 98J LED, Spec Sheet, from http://www.apogeetranslite.com/series-98j-c17ih.

* cited by examiner

MODULAR LED LIGHTING ASSEMBLY

CROSS REFERENCE TO RELATED APPLICATIONS

This application claims the benefit of U.S. Provisional Application No. 61/391,608 filed Oct. 9, 2010; the disclosures of which are incorporated herein by reference.

BACKGROUND OF THE DISCLOSURE

1. Technical Field

The disclosure generally relates to LED lighting devices and, more particularly, to modular LED lighting units that may be uniquely configured by the user at the location where the lighting is desired.

2. Background Information

Although the benefits of upgrading traditional lighting to efficient lighting based on light emitting diodes (LEDs) is known, additional LED lighting configurations are desired in the marketplace.

SUMMARY OF THE DISCLOSURE

The disclosure provides a modular lighting assembly using LED banks as the light sources. The assembly allows the power supply and LED banks to be independently replaced. The assembly uses a power supply that is separated from the LED banks and electrically connected to the LED banks with a plug connector that may be unplugged and plugged back in to allow the power supply or LED bank to be independently and readily replaced.

The disclosure provides an assembly that provides for easy replacement of the different components of the assembly. One feature that makes the components easier to replace is that the light modules and/or the power supply may be carried by the housing that is removable from the base mount that is secured to a mounting structure such as a wall or ceiling. This configuration allows the replacement to occur at ground level rather than requiring the worker to be positioned up on a ladder.

The disclosure also provides a mount that allows the power supply and LED banks to be placed at different locations and allows for the LED banks and power supplies to be removed and replaced.

The mount allows the light generated from the system to be directed in different directions based on the installation position of the LED banks. The housing that mounts the light modules is angled at different directions with respect to its base to cast the light generated by the light modules in desired directions.

The disclosure also provides a lighting assembly that has a low power mode that may be activated to reduce power consumption. The low power mode may be activated manually, automatically, or remotely.

The disclosure also provides a lighting assembly that may be used in underground applications including underground train systems.

The disclosure provides a LED lighting assembly that may be powered from a 480V, three phase input.

The disclosure provides a lighting assembly with improved efficiency.

BRIEF DESCRIPTION OF THE DRAWINGS

Similar numbers refer to similar parts throughout the specification.

DETAILED DESCRIPTION OF THE DISCLOSURE

Figure 1:
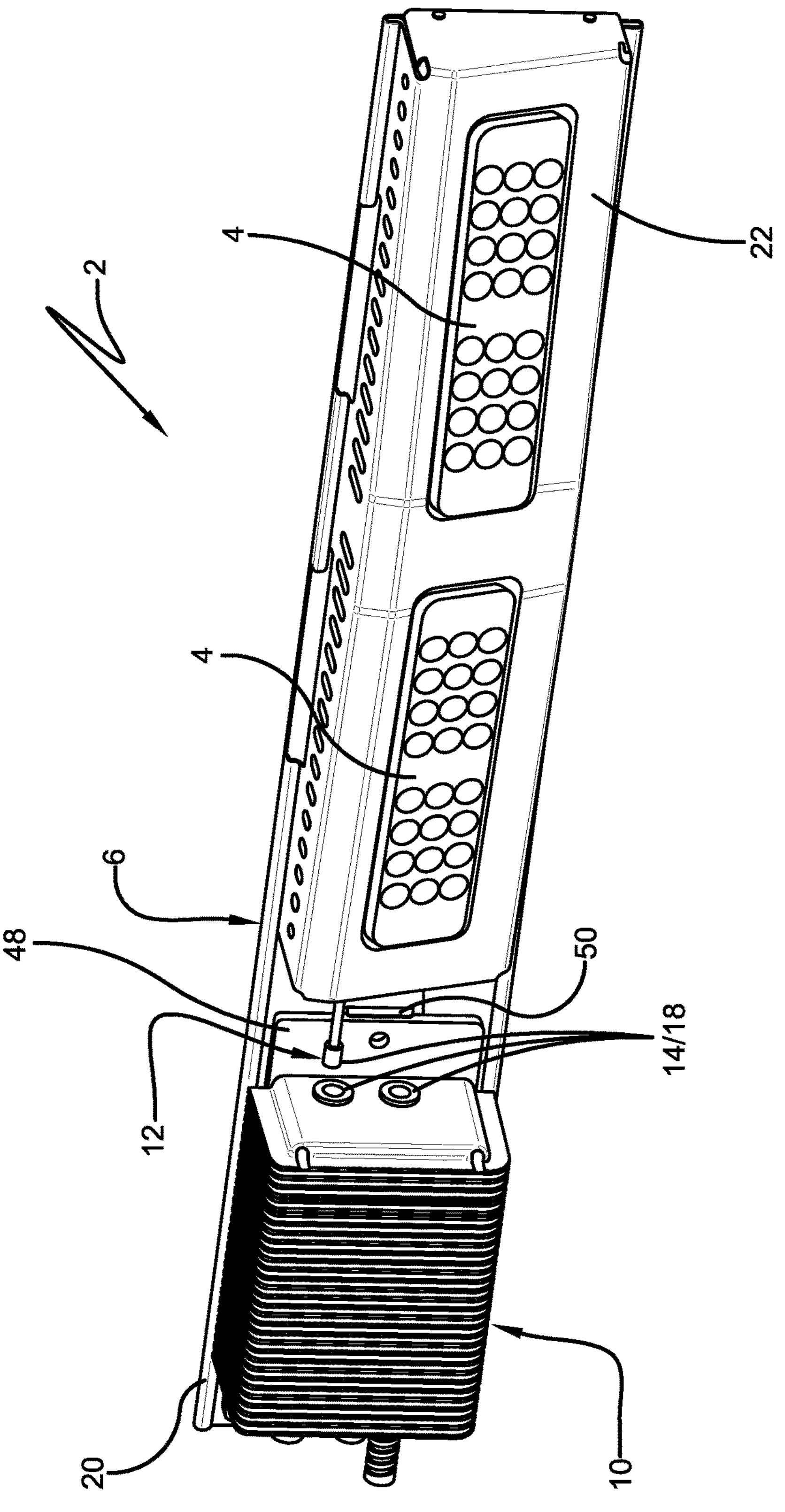
FIG. 1 is perspective view of an exemplary modular light assembly.

An exemplary configuration of a lighting assembly is indicated generally by the numeral 2 in the accompanying drawings. Lighting assembly 2 may be used in a wide variety of environments and is particularly configured for underground utility or underground transportation applications. Assembly 2 may be used for tunnel lighting, subways, parking garages, harsh-environment conditions, architectural and industrial operations including petroleum, mining, and power generation. Assembly 2 is configured to function in damp environments and is configured to be impervious to dust such as steel dust and corrosion. Assembly 2 is configured to have an operating temperature in the general range of −20° to 50° C.

Assembly 2 uses a plurality of light emitting diode (LED) light sources grouped to function as a single light source referred to herein as an LED banks or LED light module 4. Module 4 provides the desired light from assembly 2. Assembly 2 allows the individual elements of the assembly to be replaced and reconfigured as desired by the end user. Assembly 2 allows the user to select the type of light module 4 used at different locations. For example, the user may install large and small light modules 4, different color light modules 4, light modules 4 having different shapes, or light modules 4 of differing lumen output. The LEDs are configured with an automotive-grade polycarbonate lens assembly. The injection molded components are low smoke, zero halogen (LSZH). Each module 4 includes a die-cast aluminum heat sink. Each module 4 has a LED Driver operating voltage of 100-277 VAC, 480 VAC. Alternate high-voltage AC/DC input may be provided. The power consumption for one exemplary configuration is 60 Watts. The LEDs may be high-output bright white LED's (~4700K). The LEDs have a rated life of 70% lumen maintenance at 50,000 hours. Modules 4 use the proprietary, precision Opticlear™ Engine to maximize light distribution to target area while minimizing glare.

Assembly 2 generally includes at least one LED module 4, a mount 6, and a power supply 10. Mount 6 is configured to carry at least one module 4 and a power supply 10. A plurality of identical or different light modules 4 may be carried by mount 6. Mount 6 may be provided in different configurations to direct the light produced by assembly 2 in different directions. Each module 4 and supply 10 may be readily mounted and dismounted to mount 6 and may be connected and disconnected from each other to allow each individual element to be replaced as needed.

Figure 4:
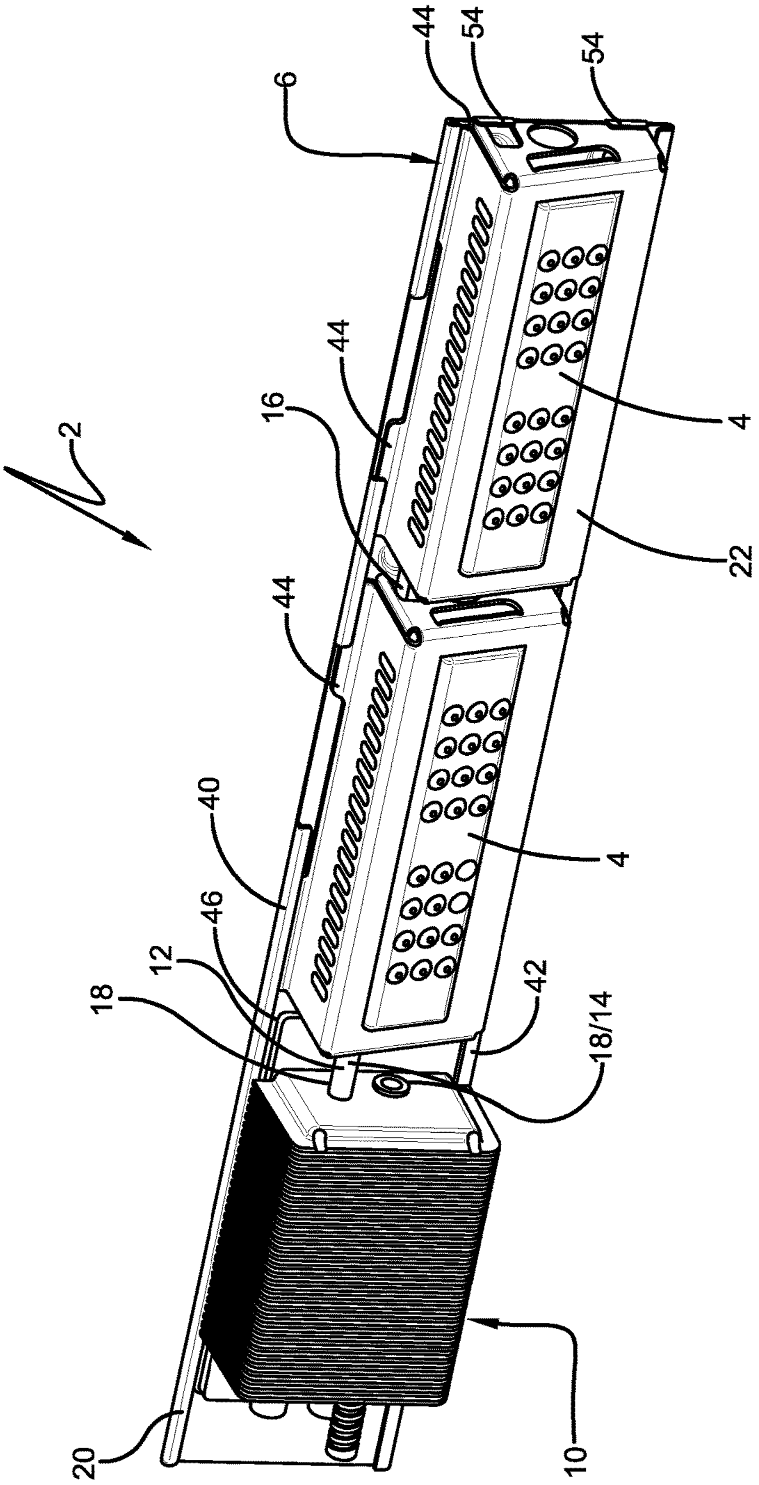
FIG. 4 is a view similar to FIG. 1 showing an alternative configuration for the modular light and mount.

Power supply 10 transforms the alternating current from commonly available electrical power sources such as 110V or 220V or a high voltage source such as 480V-three phase, to a low voltage direct current power supply that is delivered to module 4 with a supply cord 12. Supply cord 12 (shown disconnected in FIG. 1 and connected in FIG. 4), power supply 10, and/or module 4 include connectors 14 configured to allow cord 12 to be readily connected and disconnected from supply 10 and/or module 4. Connectors 14 may be waterproof and locking. A waterproof IP67 connector may be used. As shown in FIG. 4, modules 4 may be connected together with a secondary electrical connector 16 such that the electrical supply flows through one module 4A to the second module 4B. Alternatively, power supply 10 may include multiple outlets 18 with an independent supply cord 12 used with each module 4. Power supply 10 may include a plug that allows assembly 2 to be plugged into the available electrical source or assembly 2 may be hard wired into the electrical source. Power supply 10 may be configured to function with a wide range of input voltages and may be configured to withstand power spikes. In the exemplary configuration, power supply 10 outputs a 24V to each supply cord 12. Power supply 10 may be double fused.

Assembly 2 may be provided with a low power feature that may be activated to reduce the amount of power consumed by assembly 2. In one configuration, the low power mode reduces power consumption by 75 percent. The low power mode may be activated and deactivated with a button or switch on power supply 10. Other configurations allow the low power mode to be activated or deactivated remotely through a wireless connection, through a computer network connection such as an Internet connection, and/or through a powerline network. These activation methods also may be used to turn assembly 2 on and off. Communication between power supply 10 and the controlling device (which may be a computer or a timer) may be through a computer network such as the Internet or an intranet, through a telephone network, through a wireless communication channel, or through any other suitable communication channel.

Mount 6 includes a base 20 and a housing 22. Base 20 is configured to be secured to a structure such as a wall or ceiling while housing 22 carries module 4 or modules 4. Modules 4 may be secured to housing 22 with connectors, a snap fit connection, or the like. Housing 22 defines an opening for each bank of LEDs in module 4. In other configurations, housing 22 is configured to carry or at least cover power supply 10. Housing 22 is readily removably from base 20 so that module 4, modules 4, or supply 10 may be replaced, reconfigured, or serviced. When module 4 is to be replaced, module 4 is unplugged from supply 10 and housing 22 and module 4 are removed together so that the replacement module 4 may be inserted into housing 22 in a location separate from the location where base 20 remains mounted.

Housing 22 may be angled up, down, left, right, or parallel with respect to base 20. When housing 22 carries multiple modules 4, housing 22 may be configured to hold modules 4 at different angles with respect to base plate 28. In the exemplary configuration, housing 22 is angled down with respect to base 20 such that the light produced by module 4 or modules 4 is angled down. As such, when base 20 is mounted to a vertical surface such as a wall, the light produced by assembly 2 is angled down toward the floor. Also in the exemplary configuration, the center of housing 22 is taller than the ends of housing 22 so that the two different light modules 4 carried by housing 22 are angled away from each other.

Housing 22 may define a plurality of openings to allow air to circulate around module 4, modules 4, and power supply 10.

Base 20 includes a generally flat base plate 28 that defines a plurality of mounting holes 30 that allow base 20 to be secured to a wide variety of surfaces with a wide variety of connectors. Each mounting hole is defined by a portion of plate 28 that projects rearwardly from a planar rear surface portion of plate 28. Base plate 28 has a first end 32, a second end 34, an upper edge 36, and a lower edge 38. Channels are defined along upper and lower edges 36 and 38 with lips 40 and 42, respectively.

Figure 2:
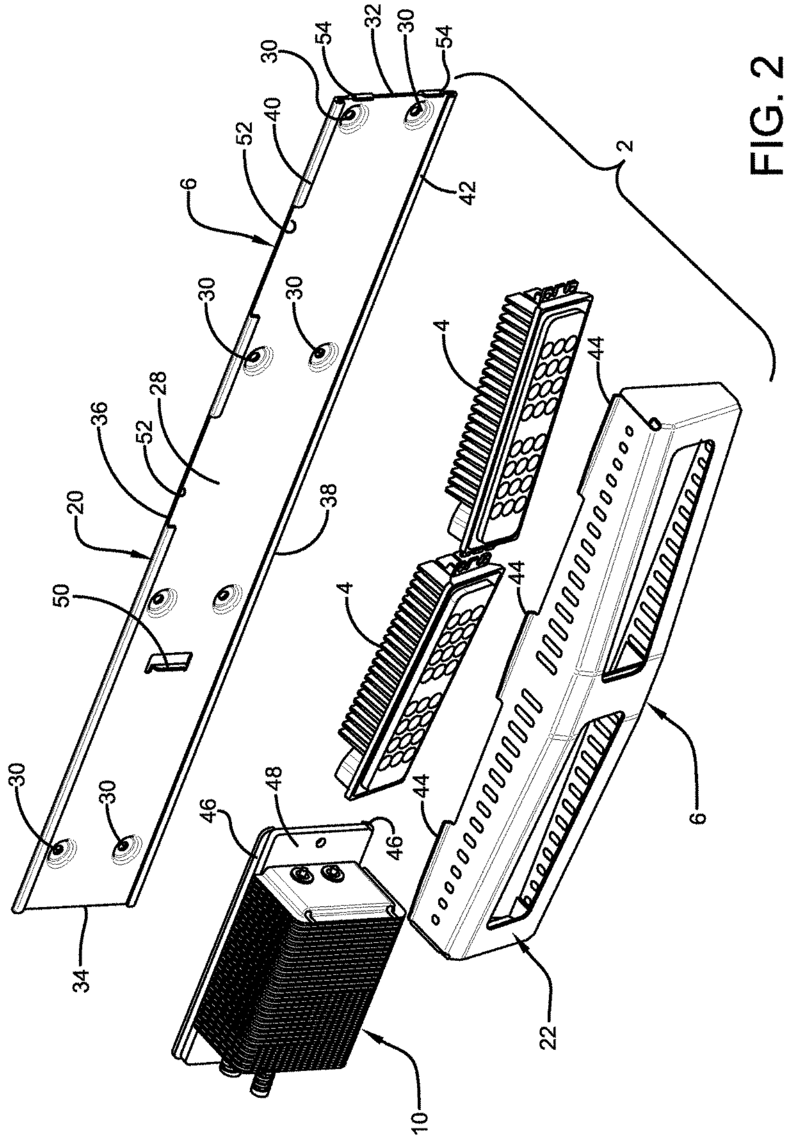
FIG. 2 is an exploded perspective view of the assembly of FIG. 1.
Figure 3:
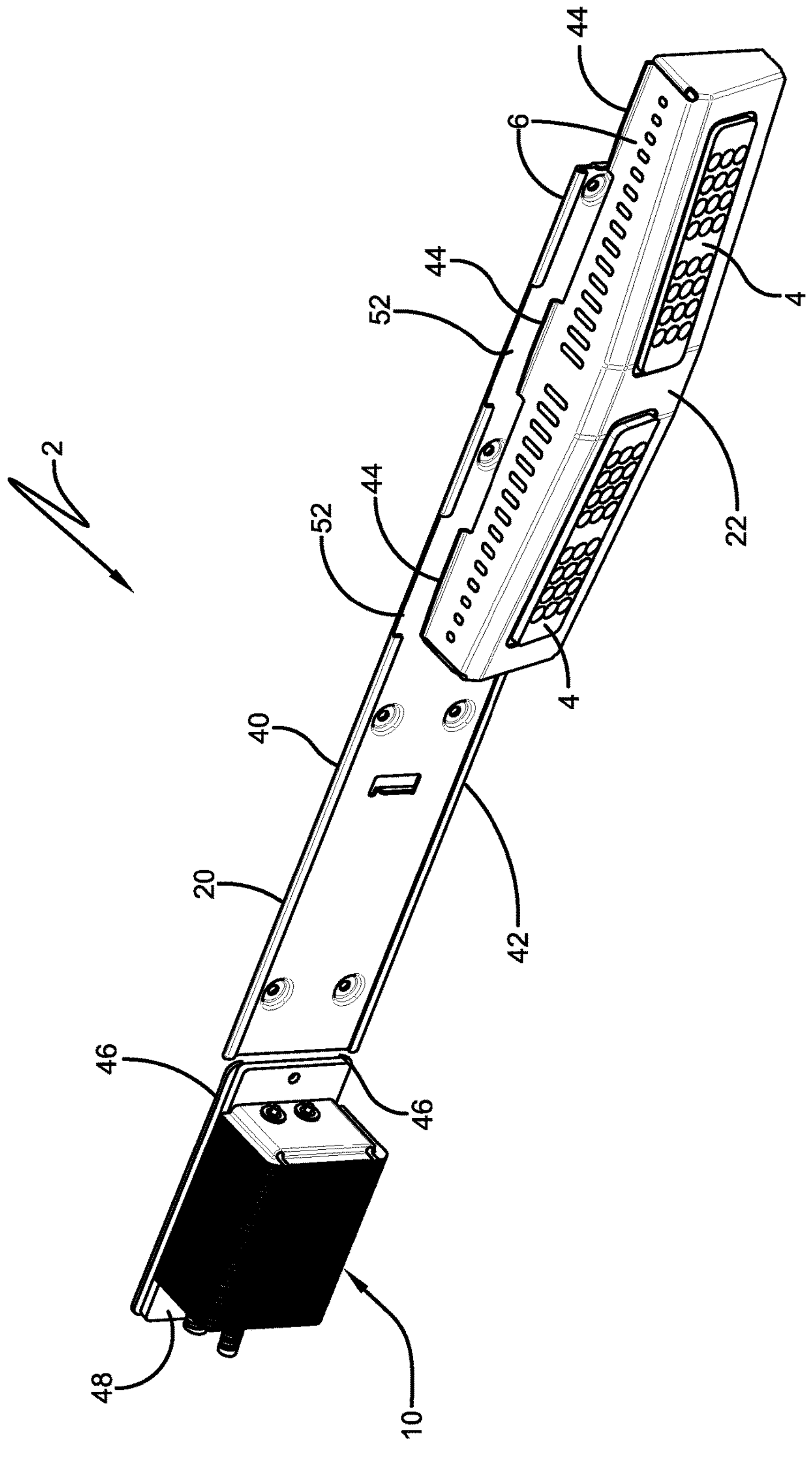
FIG. 3 is an exploded perspective view showing how the power supply and LED banks interact with the mount.

Flanges 44 projecting from housing 22 are sized to slide within these channels between lips 40/42 and base plate 28 to retain housing 22 with respect to base 20. Power supply 10 includes its own flanges 46 that project from a power supply mounting plate 48 that mounts power supply 10 to base in the same manner. Flanges 44/46 may be freely slidable within the channels or may be tapered to allow for easy insertion and frictional locking within the channels. The frictional locking occurs when the tip-to-tip distance from flange 44 to the opposite flange 44 is essentially the same dimension—or just smaller than—the dimension from the inside of one channel to the inside of the other channel. FIGS. 2 and 3 depict tapered ends on flanges 44 while FIG. 4 depicts rounded ends. Flanges 44 also may be frictionally pinched by being slightly thicker than the channels.

Power supply 10 may be connected to base 20 by sliding flanges 46 into the open end of the channels behinds lips 40/42 at second end 34 of base 20. A stop 50 projects forward from base plate 28. Power supply 10 abuts stop 50 when in the proper position. A connector, such as a screw or bolt, may be used to secure power supply 10 in place. Supply cord 12 also holds power supply 10 in place. Alternatively, flanges 46 may be configured to lock into the channels with friction fits or snap fits. In other configurations, power supply 10 is mounted within and carried by housing 22.

Flanges 44 may be continuous such that housing 22 is slid into the channels through first end 32 in the same manner as power supply 10. In the exemplary configuration, flanges 44 are spaced and lip 40 defines gaps 52 so that housing 22 may be installed by resting its lower flange 44 behind lip 42 with the upper flanges 44 aligned with gaps 52. Housing 22 is then pivoted toward plate 28 until its upper flanges 44 are aligned with the channel behind lip 40. Housing 22 is then slid sideways until at least a portion of the upper flanges 44 are disposed behind lip 40.

There are alternatives to lock housing 22 in place with respect to base 20. Flanges 44 may be configured to lock into the channels with snap fitting members. Alternatively, a mechanical connector may be used between housing 22 and base 20.

In one configuration, gaps 52 are configured to allow housing to be positioned behind lips 40/42 and slid to the right until housing abuts stop flanges 54. In other configurations, flanges 54 pivot out of the way or are configured to not interfere with housing 22 during the installation of housing 22.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustrations provided herein are examples and the invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A modular LED lighting assembly, comprising:

a mount having a base and a housing; the housing being removably and replaceably carried by the base;

a first light module carried by the housing such that the first light module is removable from the base with the housing; the first light module including a plurality of light emitting diodes;

a power supply electrically connected to the first light module; the power supply being removably and replaceably carried by the base next to the housing;

the power supply being electrically connected to the first light module with a first electrical connector that selectively connects the first light module to the power supply such that the connection may be made and remade as desired such that the power supply may be selectively disconnected from the first light module replaced without removing and replacing the light module;

a second light module carried by the housing such that the second light module is removable from the base with the housing; the second light module including a plurality of light emitting diodes;

wherein the first and second light modules are angled down when the base is disposed vertically;

wherein the base has a first end, a second end, an upper edge, and a lower edge;

the base including lips bent over the base to define channels along the upper and lower edges;

the housing having flanges disposed within the channels behind the lips to retain the housing with respect to the base; and wherein the power supply includes flanges disposed within the channels behind the lips to retain the power supply with respect to the base.

2. The assembly of claim 1, wherein the flanges are frictionally engaged by the lips.

3. The assembly of claim 1, wherein the flanges are tapered to lock within the channels.

4. The assembly of claim 1, wherein the lip disposed along the upper edge is formed from a plurality of spaced lips that define gaps in the channel.

5. The assembly of claim 1, wherein the power supply is slidable between a position where the power supply is mounted to the base and a position where the power supply is released from the base.

6. The assembly of claim 5, wherein the base includes a stop that is engaged by the power supply when the power supply is mounted to the base.

7. A modular LED lighting assembly, comprising:

a mount having a base and a housing; the housing being removably and replaceably carried by the base;

a first light module carried by the housing such that the first light module is removable from the base with the housing; the first light module including a plurality of light emitting diodes;

a power supply electrically connected to the first light module; the power supply being removably and replaceably carried by the base next to the housing;

the power supply being electrically connected to the first light module with a first electrical connector that selectively connects the first light module to the power supply such that the connection may be made and remade as desired such that the power supply may be selectively disconnected from the first light module replaced without removing and replacing the light module;

wherein the base has a first end, a second end, an upper edge, and a lower edge;

the base including lips bent over the base to define channels along the upper and lower edges; and the power supply includes flanges disposed within the channels behind the lips to selectively mount the power supply to the base.

8. The assembly of claim 7, wherein the power supply is slidable between a position where the power supply is mounted to the base and a position where the power supply is released from the base.

9. The assembly of claim 7, wherein the base includes a stop that is engaged by the power supply when the power supply is mounted to the base.

10. A modular LED light fixture, comprising:

a mount having an elongated base having a pair of spaced elongated edges that run in the longitudinal direction of the base; each of the edges defining a mounting channel;

the mount also including a housing mountable to the base through engagement with the mounting channels;

the housing being selectively movable with respect to the base between a retained closed condition wherein an interior of the housing is closed by the base and an open condition wherein the interior of the housing is accessible;

an LED module having a plurality of light emitting diodes; the LED module being carried by the housing intermediate the elongated edges of the base;

a power supply for the LED module electrically connected with the LED module and being disposed intermediate the elongated edges of the base; and wherein the power supply is electrically connected to the LED module with a first electrical connector that selectively connects the LED module to the power supply such that the connection may be made and remade as desired such that the power supply may be selectively disconnected from the LED module to allow for removal and replacement.

11. The light fixture of claim 10, wherein a plurality of LED modules are carried by the housing intermediate the elongated edges of the base; the plurality of LED modules being in longitudinal alignment.

12. The light fixture of claim 11, wherein the LED modules are longitudinally spaced apart within the housing.

13. The light fixture of claim 10, wherein the housing defines an opening; the LED module being aligned with the opening to position the plurality of light emitting diodes in alignment with the opening.

14. The light fixture of claim 13, wherein the housing defines a plurality of spaced openings aligned in the longitudinal direction; an LED module having a plurality of light emitting diodes disposed in alignment with each opening.

15. The light fixture of claim 14, wherein the power supply is in longitudinal alignment with the LED modules.

16. The light fixture of claim 10, wherein the power supply is spaced from the LED module.

17. A modular LED light fixture, comprising:

a mount having an elongated base that defines first and second spaced mounting channels;

the mount also including a housing selectively mountable to the elongated base through engagement with the first and second spaced mounting channels;

the housing being selectively movable with respect to the base between a retained closed condition wherein an interior of the housing is closed by the base and an open condition wherein the interior of the housing is accessible;

at least a first LED module having a plurality of light emitting diodes;

each LED module carried by the housing being disposed intermediate the first and second spaced mounting channels of the base;

a power supply for the first LED module electrically connected with the first LED light and being disposed intermediate the first and second spaced mounting channels of the base; and wherein the power supply is electrically connected to the first LED module with a first electrical connector that selectively connects the first LED module to the power supply such that the connection may be made and remade as desired such that the power supply may be selectively disconnected from the first LED module to allow for removal and replacement.

18. The light fixture of claim 17, further comprising a second LED module electrically connected to the first LED module; the second LED module being carried by the housing independent of the first LED module.

19. A modular LED light fixture, comprising:

a mount having an elongated base that defines first and second spaced mounting channels;

the mount also including a housing selectively mountable to the elongated base through engagement with the first and second spaced mounting channels;

the housing being selectively movable with respect to the base between a retained closed condition wherein an interior of the housing is closed by the base and an open condition wherein the interior of the housing is accessible;

at least a first LED module having a plurality of light emitting diodes;

each LED module carried by the housing being disposed intermediate the first and second spaced mounting channels of the base; and a power supply for the first LED module electrically connected with the first LED light and being disposed intermediate the first and second spaced mounting channels of the base;

a second LED module electrically connected to the power supply; the second LED module being carried by the housing independent of the first LED module; and wherein the power supply is electrically connected to each LED module with an electrical connector that selectively connects such that the connection may be made and remade as desired such that the power supply may be selectively disconnected from the LED modules to allow for removal and replacement.

20. A modular LED light fixture, comprising:

a mount having an elongated base that defines first and second spaced mounting channels;

the mount also including a housing selectively mountable to the elongated base through engagement with the first and second spaced mounting channels;

the housing being selectively movable with respect to the base between a retained closed condition wherein an interior of the housing is closed by the base and an open condition wherein the interior of the housing is accessible;

a first LED module having a plurality of light emitting diodes; the first LED module being carried by the housing intermediate the first and second spaced mounting channels of the base;

a second LED module having a plurality of light emitting diodes; the second LED module being carried by the housing intermediate the first and second spaced mounting channels of the base;

the second LED module being mounted independent of the first LED module to allow for individual removal and replacement of the LED modules;

a power supply electrically powering the first and second LED modules; and wherein the power supply is electrically connected to the first LED module with a first electrical connector that selectively connects the first LED module to the power supply such that the connection may be made and remade as desired such that the power supply may be selectively disconnected from the first LED module to allow for removal and replacement.

21. The light fixture of claim 20, wherein the power supply is connected to the first and second LED modules in series.

22. The light fixture of claim 20, wherein the power supply is connected to the first and second LED modules in parallel.

* * * * *